US012542158B1

(12) United States Patent
Greenberg et al.

(10) Patent No.: US 12,542,158 B1
(45) Date of Patent: Feb. 3, 2026

(54) EDGE PROFILED MEDIA SUBSTRATE

(71) Applicant: Seagate Technology LLC, Fremont, CA (US)

(72) Inventors: Thomas Larson Greenberg, Berkeley, CA (US); Robin Andrew Davies, Livermore, CA (US); Clay Harrison Heberly, San Jose, CA (US); Joachim Ahner, Livermore, CA (US)

(73) Assignee: Seagate Technology LLC, Fremont, CA (US)

( * ) Notice: Subject to any disclaimer, the term of this patent is extended or adjusted under 35 U.S.C. 154(b) by 508 days.

(21) Appl. No.: 17/825,428

(22) Filed: May 26, 2022

Related U.S. Application Data

(62) Division of application No. 16/259,750, filed on Jan. 28, 2019, now Pat. No. 11,367,462.

(51) Int. Cl.
| | |
|---|---|
| *G11B 5/82* | (2006.01) |
| *B23K 26/00* | (2014.01) |
| *B23K 26/035* | (2014.01) |
| *B23K 26/08* | (2014.01) |
| *B23K 26/362* | (2014.01) |

(Continued)

(52) U.S. Cl.
CPC ............ *G11B 5/82* (2013.01); *B23K 26/0006* (2013.01); *B23K 26/035* (2015.10); *B23K 26/0823* (2013.01); *B23K 26/362* (2013.01); *B23K 26/364* (2015.10); *B23K 26/38* (2013.01); *B23K 26/402* (2013.01); *G11B 5/73911* (2019.05); *G11B 5/73921* (2019.05); *G11B 5/8404* (2013.01); *G11B 23/0021* (2013.01); *B23K 2103/52* (2018.08); *B23K 2103/54* (2018.08); *G11B 5/73923* (2019.05)

(58) Field of Classification Search
CPC .... B23K 26/364; B23K 26/3576; G11B 5/82; G11B 2220/2516; G11B 23/0316
See application file for complete search history.

(56) References Cited

U.S. PATENT DOCUMENTS

| | | | |
|---|---|---|---|
| 5,521,781 A | 5/1996 | Kaneko et al. | |
| 6,212,159 B1 * | 4/2001 | Mori | ................... G11B 17/0282 |

(Continued)

OTHER PUBLICATIONS

U.S. Patent Office issued prosecution for U.S. Appl. No. 16/259,750, filed Jan. 28, 2019, including: Notice of Allowance and Fees Due (PTOL-85) and Examiner Initiated Interview Summary issued Feb. 23, 2022, 11 pages; Ex parte Quayle Action issued Dec. 8, 2021, 7 pages; Applicant Initiated Interview Summary issued Aug. 31, 2021, 3 pages; Non-Final Rejection issued May 28, 2021, 22 pages; Requirement for Restriction-Election issued Jan. 28, 2021, 8 pages; Requirement for Restriction-Election issued Sep. 10, 2020, 6 pages.

*Primary Examiner* — Steven W Crabb
*Assistant Examiner* — Spencer H. Kirkwood
(74) *Attorney, Agent, or Firm* — Westman, Champlin & Koehler, P.A.

(57) ABSTRACT

A non-metallic media substrate includes a disc-shaped substrate body having at least one media storage surface on a face thereof. The substrate body has a center opening having an inner diameter and an outer diameter surface, and the substrate body has a thickness. The substrate further includes an annular groove at the outer diameter of the media substrate, the annular groove having chamfered edges and an internal concavity extending toward the inner diameter.

10 Claims, 8 Drawing Sheets

(51) Int. Cl.
  *B23K 26/364* (2014.01)
  *B23K 26/38* (2014.01)
  *B23K 26/402* (2014.01)
  *B23K 103/00* (2006.01)
  *G11B 5/73* (2006.01)
  *G11B 5/84* (2006.01)
  *G11B 23/00* (2006.01)

(56) References Cited

U.S. PATENT DOCUMENTS

| | | | |
|---|---|---|---|
| 6,363,599 B1 | 4/2002 | Bajorek | |
| 6,521,862 B1 | 2/2003 | Brannon | |
| 6,795,274 B1 * | 9/2004 | Hsieh | G11B 5/8404 |
| | | | 219/121.72 |
| 7,180,709 B2 | 2/2007 | Kim et al. | |
| 8,016,645 B2 | 9/2011 | Nakiri et al. | |
| 8,083,115 B2 | 12/2011 | Rayssac et al. | |
| 9,240,201 B2 * | 1/2016 | Adachi | G11B 5/4813 |
| 10,384,306 B1 * | 8/2019 | Beresford | B23K 26/0869 |
| 2003/0156531 A1 * | 8/2003 | Ferguson | G11B 5/82 |
| 2005/0002982 A1 | 1/2005 | Mooney et al. | |
| 2010/0247977 A1 | 9/2010 | Tsuchiya et al. | |
| 2012/0187547 A1 | 7/2012 | Nemoto et al. | |
| 2012/0241916 A1 * | 9/2012 | Daubenspeck | H01L 21/02021 |
| | | | 438/700 |
| 2014/0036338 A1 * | 2/2014 | Bareman | C03B 33/091 |
| | | | 359/267 |
| 2018/0261490 A1 * | 9/2018 | Martin | B25J 17/0208 |
| 2021/0061699 A1 | 3/2021 | Azuma | |

* cited by examiner 504 1000

1100 ↘

1102 ↘
Provide non-metallic media substrate with annular groove along outer diameter 1104 ↘
Align annular groove with registration support

1200 ↘

1202 ↘
Laser cut substrate from a sheet of substrate material, with inner circular opening having inner diameter, and outer diameter 1204 ↘
Form annular groove in a thickness of a surface at the outer diameter

EDGE PROFILED MEDIA SUBSTRATE

CROSS-REFERENCE TO RELATED APPLICATIONS

This application is a divisional of U.S. application Ser. No. 16/259,750, filed on Jan. 28, 2019, the content of which is hereby incorporated by reference in its entirety.

SUMMARY

In one embodiment, a non-metallic media substrate includes a disc-shaped substrate body having at least one media storage surface on a face thereof. The substrate body has a center opening having an inner diameter and an outer diameter surface, and the substrate body has a thickness. The media substrate further includes an annular groove at the outer diameter of the media substrate, the annular groove having chamfered edges and an internal concavity extending toward the inner diameter.

In another embodiment, a method of registering a non-metallic media substrate for processing includes providing the non-metallic media substrate with an annular groove along its outer diameter, and aligning the annular groove with a registration support for processing.

In yet another embodiment, a method of manufacturing a hard disc drive substrate includes laser cutting the substrate from a sheet of substrate material, the substrate having an inner circular opening with an inner diameter, and an outer diameter, and forming an annular groove in a thickness of a surface at the outer diameter.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the present disclosure provide non-metallic media substrate mechanical enhancement to promote bias capability and better mechanical alignment. The embodiments provide disks that are more easily and precisely registered for processing. Embodiments of the present disclosure also provide methods for registering disks for processing, and for manufacturing disks that are more easily registered during processing. Media substrates of the present disclosure have an outer diameter annular groove for location and process improvements.

In one embodiment, a non-metallic media substrate comprises an annular groove on its outside diameter (OD) edge. The annular groove promotes, in one embodiment, bias capability and increased mechanical alignment for processing. This edge profile allows for positioning the media in a controlled manner, promoting precise location in tooling. Further, this edge profile also provides for reliable bias contact feature for process repeatability. With a more reliable contact, loss of performance and interruption to a sputtering tool due to misalignment, or to variations in alignment, is reduced or eliminated.

Embodiments of the present disclosure allow for a shielded, non-shadowing contact, improving the ability of a substrate to reliably conduct current during a biased deposition process. They also promote a more centered repeatable location for the substrate to be heated, cooled and monitored for process monitoring.

Data storage systems commonly have one or more data storage media and one or more elements that communicate with the data storage media to store and retrieve data. Data storage media may be magnetic storage media, optical storage media, etc. Magnetic storage media such as magnetic discs may comprise a substrate on which a non-magnetic underlayer, a magnetic layer and a protective overcoat are deposited by vacuum sputter deposition, followed by application of a thin layer of lubricant. A sputter deposition tool used for magnetic disc fabrication may include one or more disc holding fixtures.

Figure 1A:
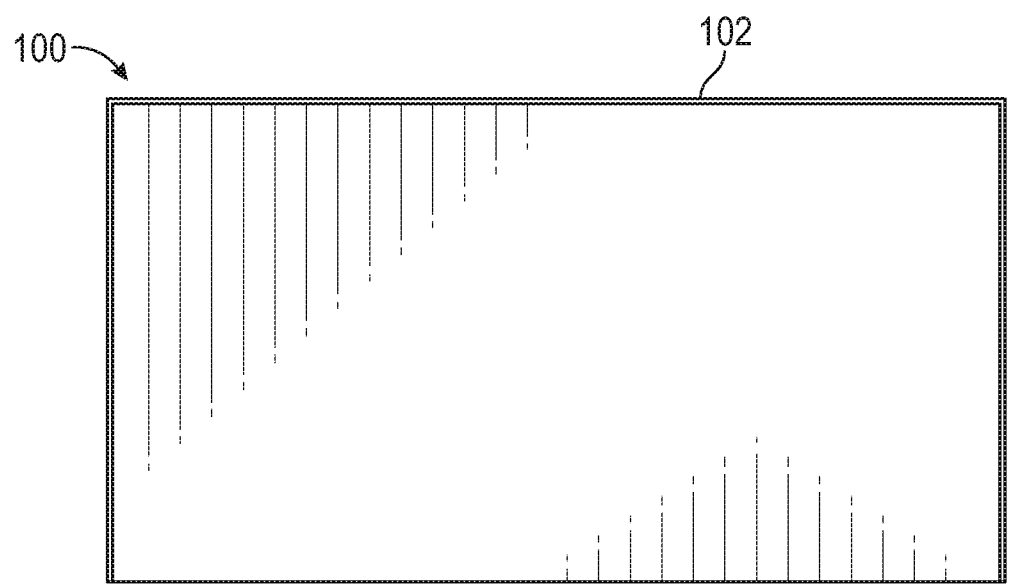
FIG. 1A is a side view of a disk edge of a disk without edge treatment.
Figure 1B:
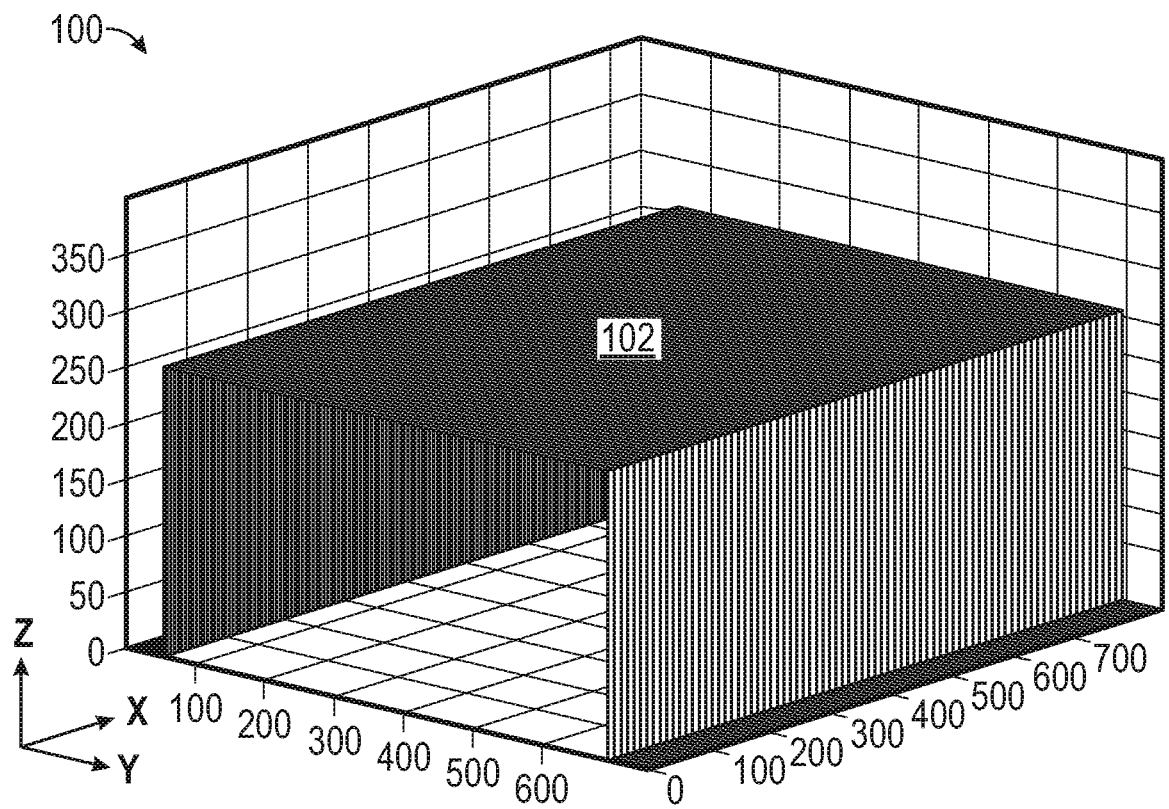
FIG. 1B is a three-dimensional graphical view of the disk edge of FIG. 1A.

Non-metallic (e.g., glass) media storage discs are in some cases cut from a larger sheet of glass. This is typically performed with laser cutting. Once the media disks are cut, they are subjected to a release step to release them from the sheet of glass. The edges of such disks, at the inner diameter (ID) and the OD may have sharp edges with abrupt transitions. A read/write head or the like is used to store data to or read data from the disk when it is in a hard disk drive (HDD) or other storage media. The read/write head is mounted on a moving arm which moves the head across the media, sweeping from or across the ID to the OD, or from the OD to the ID. Sharp edges at the ID and OD, such as those on laser cut disks, can shred buff tape or damage heads, rendering the disk or the head unusable. A side profile and perspective view of a disk edge 102 of a disk 100 before any edge processing is shown in FIGS. 1A and 1B.

Figure 2A:
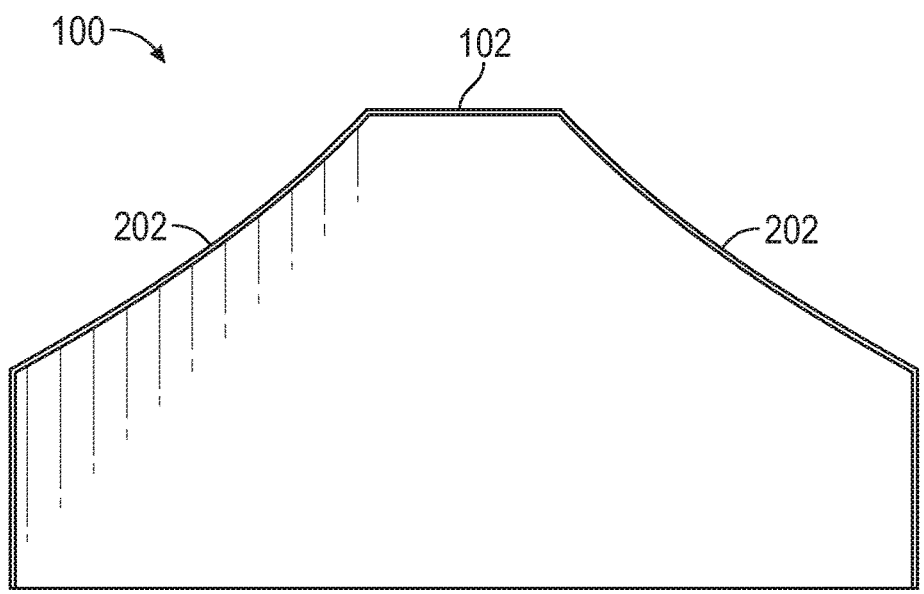
FIG. 2A is a side view of a disk edge of a disk with a chamfered edge treatment.
Figure 2B:
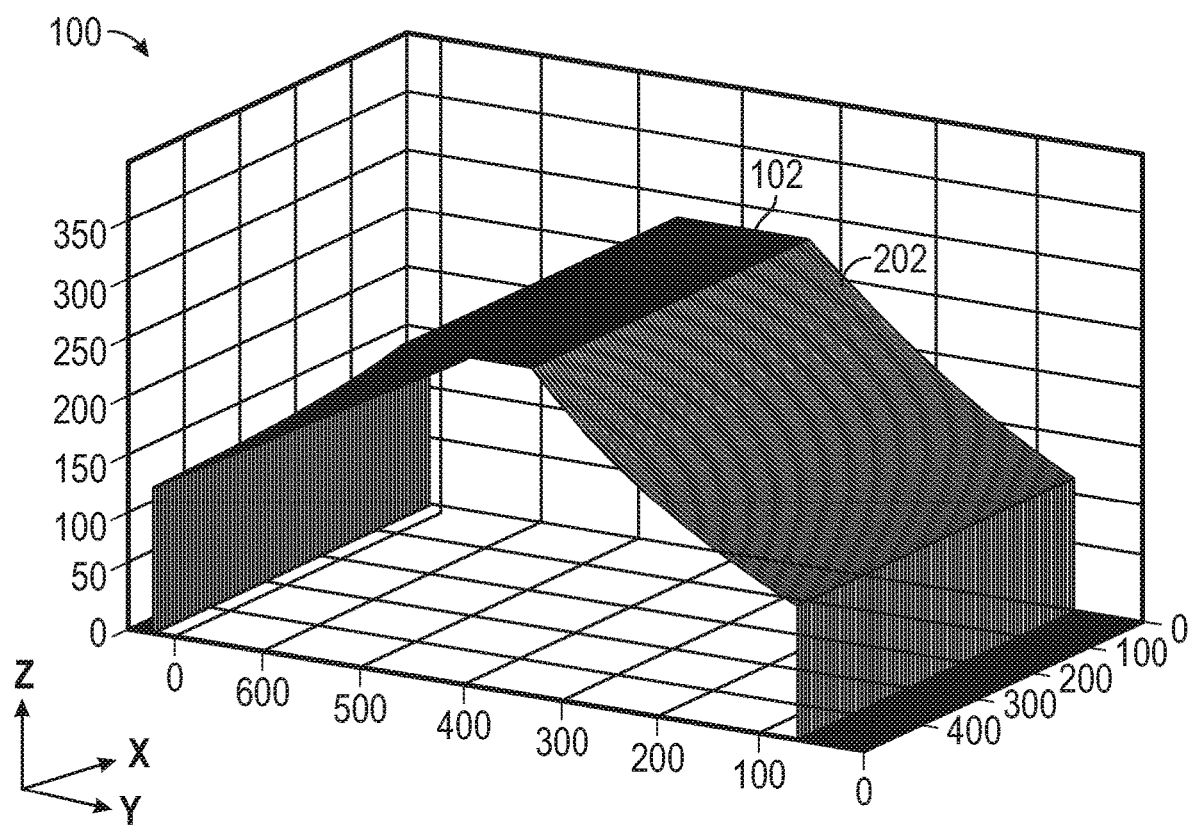
FIG. 2B is a three-dimensional graphical view of the disk edge of FIG. 2A.
Figure 3A:
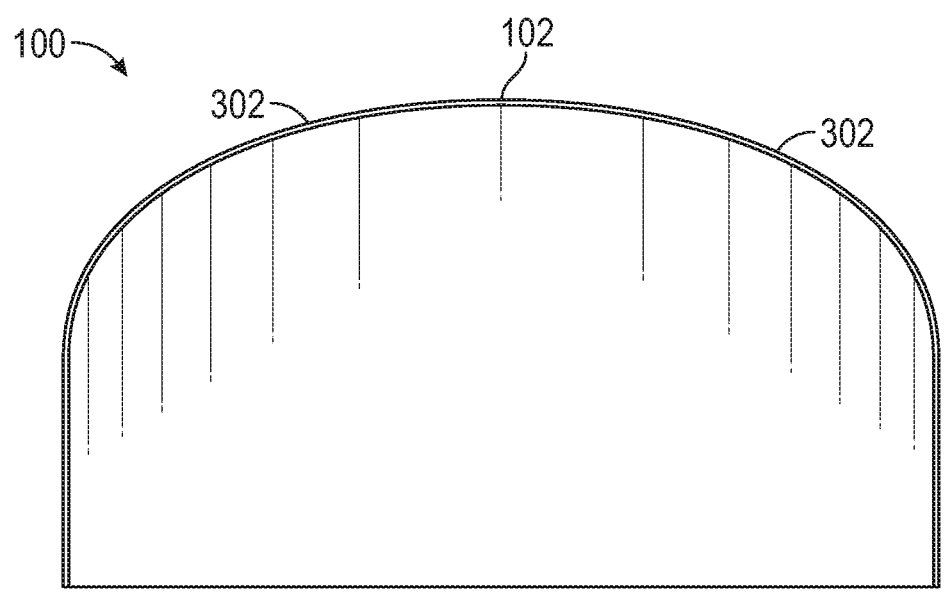
FIG. 3A is a side view of a disk edge of a disk with a radiused edge treatment.
Figure 3B:
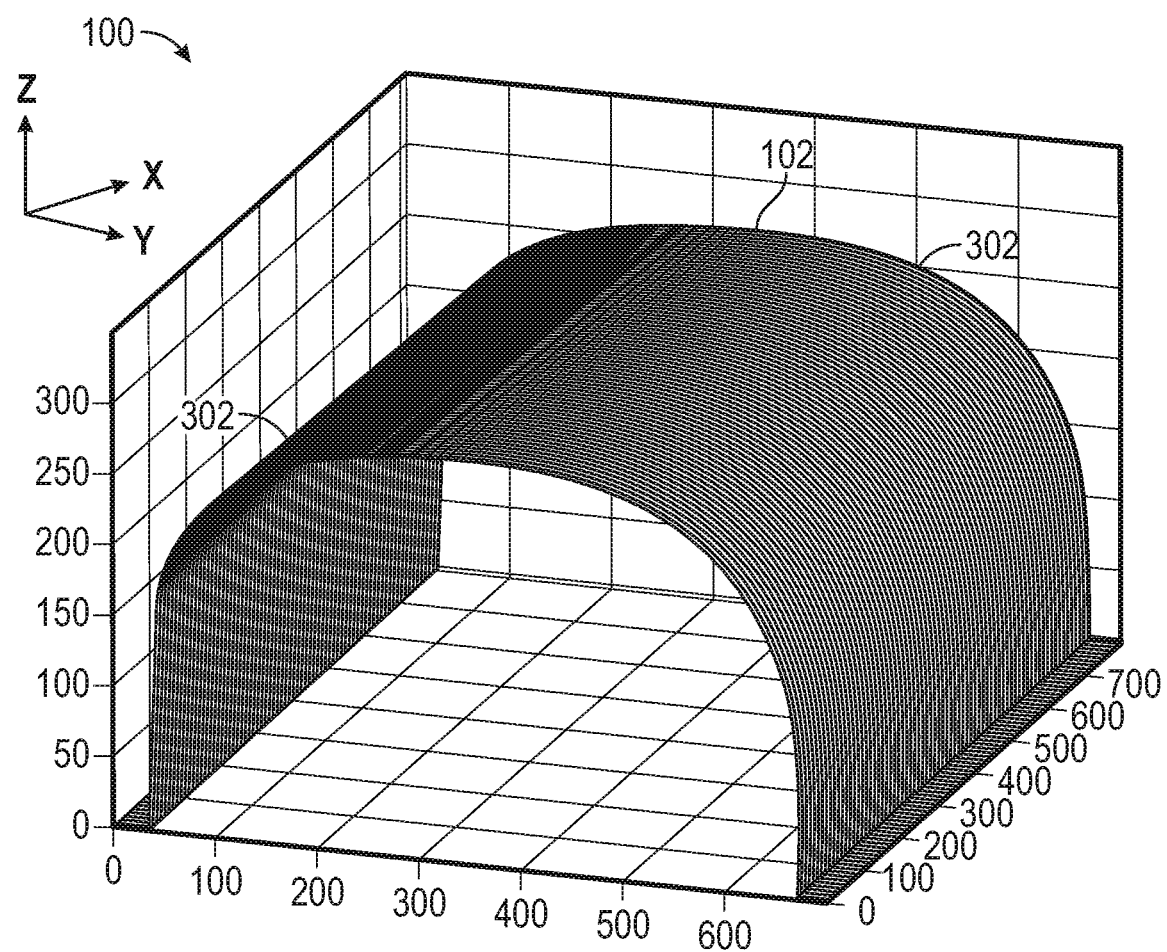
FIG. 3B is a three-dimensional graphical view of the disk edge of FIG. 3A.

Such sharp edges are typically profiled to smooth the rough edges of the disk. For example, the disk 100 having a chamfered edge treatment is shown in FIGS. 2A and 2B. Chamfered portions 202 reduce the sharpness of the edge 102. Another edge treatment is shown in FIGS. 3A and 3B. Disk 100 as shown in FIGS. 3A and 3B is radiused at its edges. The radiused edge portions 302 also reduce the sharpness of the edge 102.

It has become more common to use lasers to cut chamfers or form radiuses instead of grinding. Lasers allow efficient methods for properly forming the chamfers or radiuses. Further, energy imparted to the disk with the use of a laser can contribute to smoothing of the edges. The laser energy allows the substrate edge surface to reflow, which can smooth any remaining rough edges.

When developing or manufacturing non-metallic substrates (e.g., glass substrates), the ability to add an electrical bias during the deposition process is used to enhance surface mobility and to improve thin film density. An electrical process is used for coating disks. When material is being deposited on media, it is typically done with a sputtering process. Some disk processing stations encourage sputter deposition with a bias on the substrate. This is done with the tooling/fixtures holding the discs. Because of this contact, a current may be induced in an electrical circuit comprising a disc, a clip for the disc, and a holder, which is biased separate from the plasma potential to get an attractive or repulsive deposition. The act of running current in clips and/or connections creates electromagnetic fields along the clips that are holding the discs.

In this configuration, the surface area of a disc attracts electrons, and the clip acts as an inductor. This results in a physical shadow in the area of where the clip touches the edge of the disc. During deposition, sputter particles may accumulate on the disc holding fixtures and clips after prolonged use of the fixtures and clips in the sputter deposition tools. Further, a saddle-like buildup may occur on clips or holders. These accumulations and/or buildups may produce an actual physical shadow where currents move around the clip. This may create a thinner area of deposition next to the clips. With the electromechanical performance of the current running through the clip, not only may an electromechanical shadow occur, but also deposition profile around the clip may be changed because of the electromagnetic field as well. Clips may be made smaller, or narrowed, but as clips get very narrow, stability for transport through processing also becomes an issue.

Further currents may be induced in manufacturing, for example the induction of eddy currents due to spinning magnets on opposite sides of magnetic targets to promote full surface utilization of the surface. Mechanical movements even without biasing may induce current by magnetically coated clips being in a pulsing field.

Figure 4:
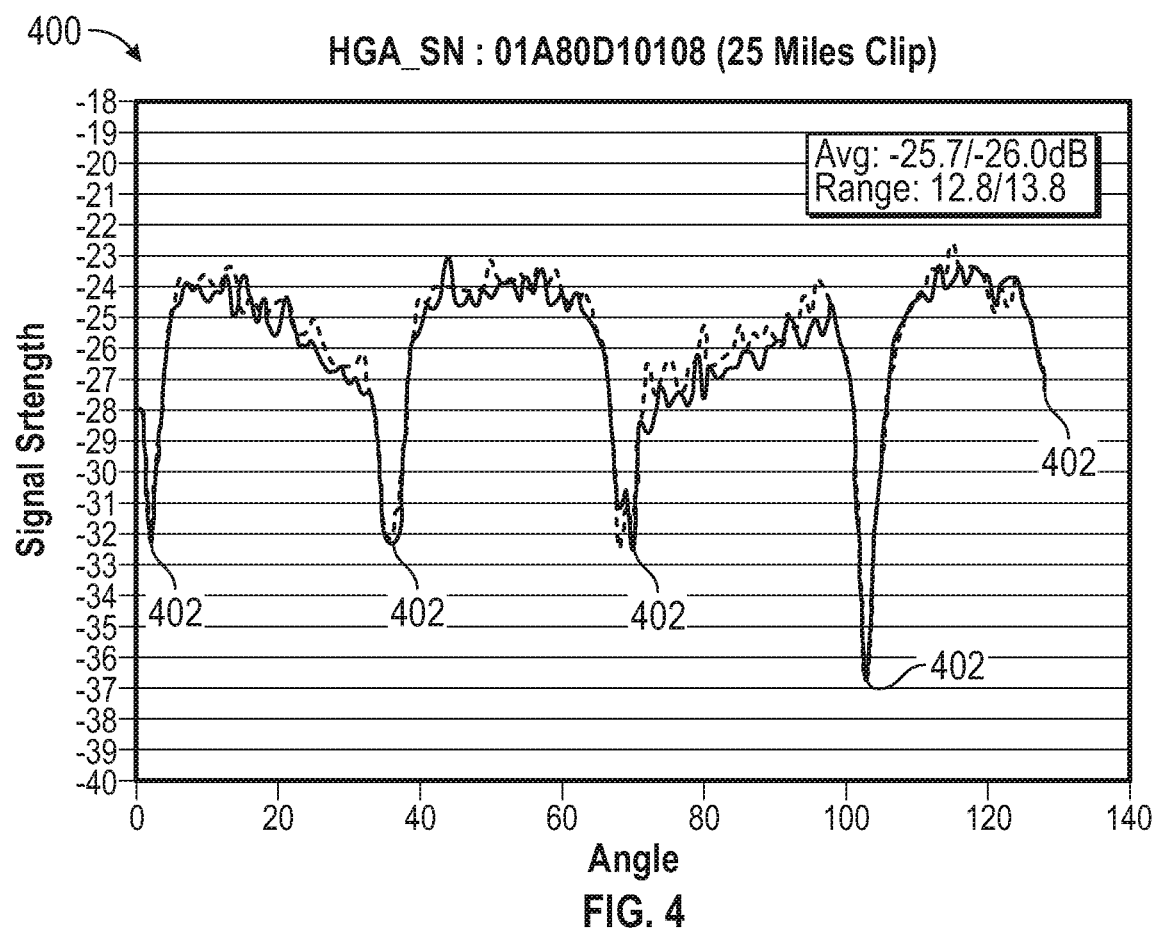
FIG. 4 is a graph showing electrical signal influence of clip to disk contact.

FIG. 4 illustrates a graph 400 showing electrical signal influence of clip to disk contact. Where clips are used in disk processing, the electrical signal in the location of the clips is seen to dip by as much as 12-14 dB. In the graph 400, the signal strength is seen to dip at points 402. This shows the influence of the use of clips on the electrical signal strength available at the clip locations. This shadow, indicating, for example, a thinner area of deposition next to the clips, may negatively affect performance.

In addition to the shadowing and inconsistent deposition when using clips in processing disks, there is further uncertainty in the physical positioning of disks in a disk processing cartridge, spindle, or the like. For example, disks may be engaged for processing by the described clips. Clips typically have a landing area for an edge of a disk that is on the order of 100/1000 (0.1) inches, whereas disk edges are on the order of 20/1000 (0.02) inches. With the landing zone on a clip that is on the order of five times the width of the disk, the plane of the flying surfaces of the disk may vary one way or the other from a center of the landing area by as much as two full thicknesses of the disk. That is, the registration in a line perpendicular to the tooling parallel to the flying surfaces may be off by as much as two full disk thicknesses. Such variance can cause issues with out of plane deposition, although this is limited due to back scattering during deposition. Further, out of plane disks may be more easily damaged, and defects that may build up may do so more unevenly than when a disk is properly registered. Still further, deposition tools are positioned at greater distances from disks during processing to account for the potentially large variation in positioning of disks.

Figure 5:
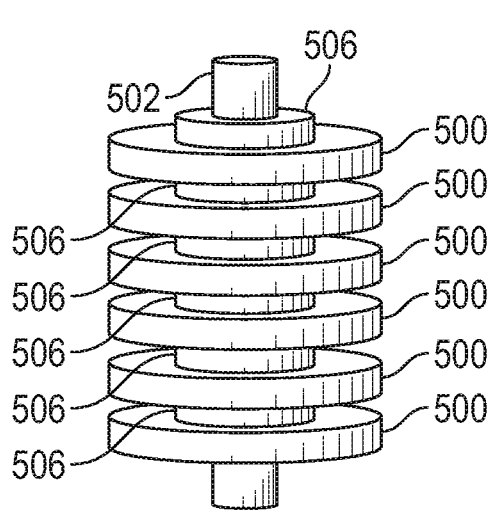
FIG. 5 is a perspective view of disks loaded on a processing spindle according to an embodiment of the present disclosure.
Figure 6:
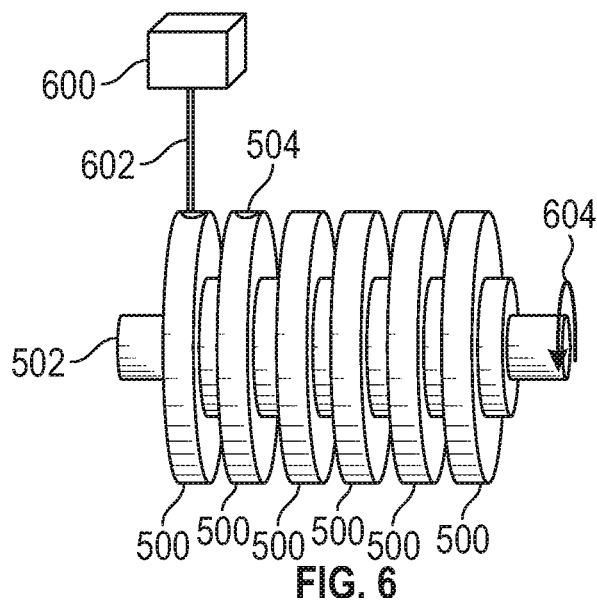
FIG. 6 is a perspective view of processing of the disks of FIG. 5.

Processing of disks according to one embodiment is shown in greater detail in FIGS. 5 and 6. When disks are initially prepared for processing, they are loaded onto a disk spindle as shown in FIG. 5. In FIG. 5, multiple disks 500 are loaded onto spindle 502 for processing. The disks are separated by spacers 506 in one embodiment. The spindle 502 has a diameter that is close to an inner dimension diameter of the disks 500, so that processing does not result in wobbling disks.

As shown in FIG. 6, disks 500, once loaded onto spindle 502, are processed with the spindle substantially horizontal. A laser 600 equipped with a galvanometer directs a laser bean 602 toward an outer diameter edge of a disk 500 for processing the disk. During the edge treatment, the spindle 502 is rotated as shown in arrow 604. This rotation also rotates the disks 500 for full circumference edge treatment of the disks 500. In one embodiment, about 25 disks 500 are processed in a cassette, spaced at about ¼ inch on center.

During processing with the laser 600, the outer edges of the disks 500 are formed with an annular groove. The shaping of the edge of each disk allows for use of clips that do not extend to a flying surface of the disks, or if they do, that are not covering areas that are used. Further, the annular groove on the outer edge of a disk allows it to be located the media in a plane where the disk is mechanically where it is desired.

With traditional disks not having an annular groove, there is a landing zone on a clip or other holder. Disk thicknesses are about 20/1000 to 25/1000 inch. Clips have a landing zone of approximately 100/1000 inch. Accordingly, disk placement on a clip may be off, such as off to a side, or off of a middle of the clip landing zone. The plane on which the disk sits once it is held by the clip may vary widely between disks. That is, the registration of a disk in a line perpendicular to its flying surfaces is variable. Tooling is used to, for example, heat and cool the surfaces during surface treatment. When disks are off from a center location on the landing zone of the clip, issues with out of plane deposition may occur. Further, the materials that are being deposited onto surfaces are very hard (e.g., oxides). Defects and damage to the glass substrates of non-metallic disks is more likely when the registration of a disk is off.

Figure 7A:
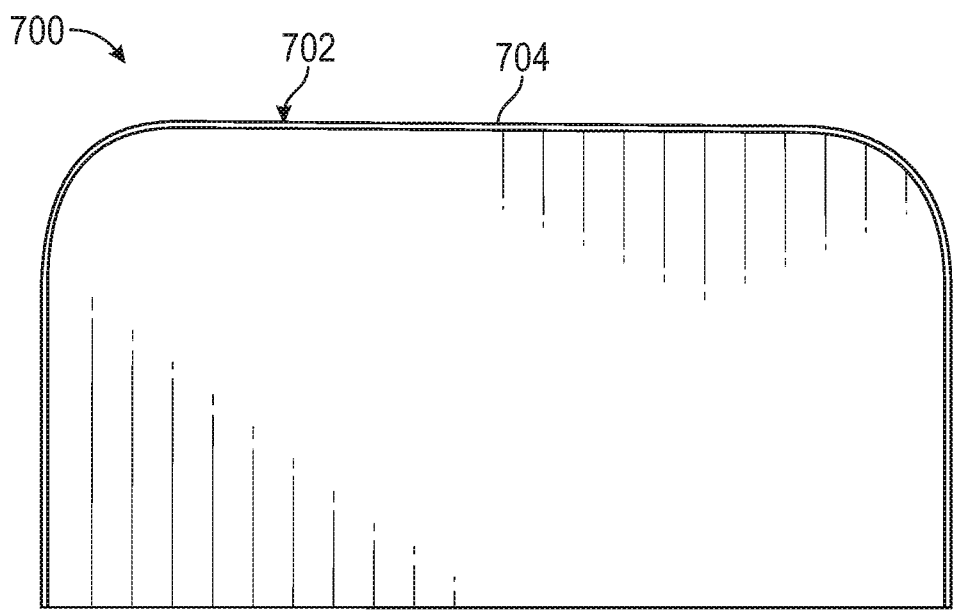
FIG. 7A is a side view of a disk edge of an annular grooved disk according to one embodiment of the present disclosure.
Figure 7B:
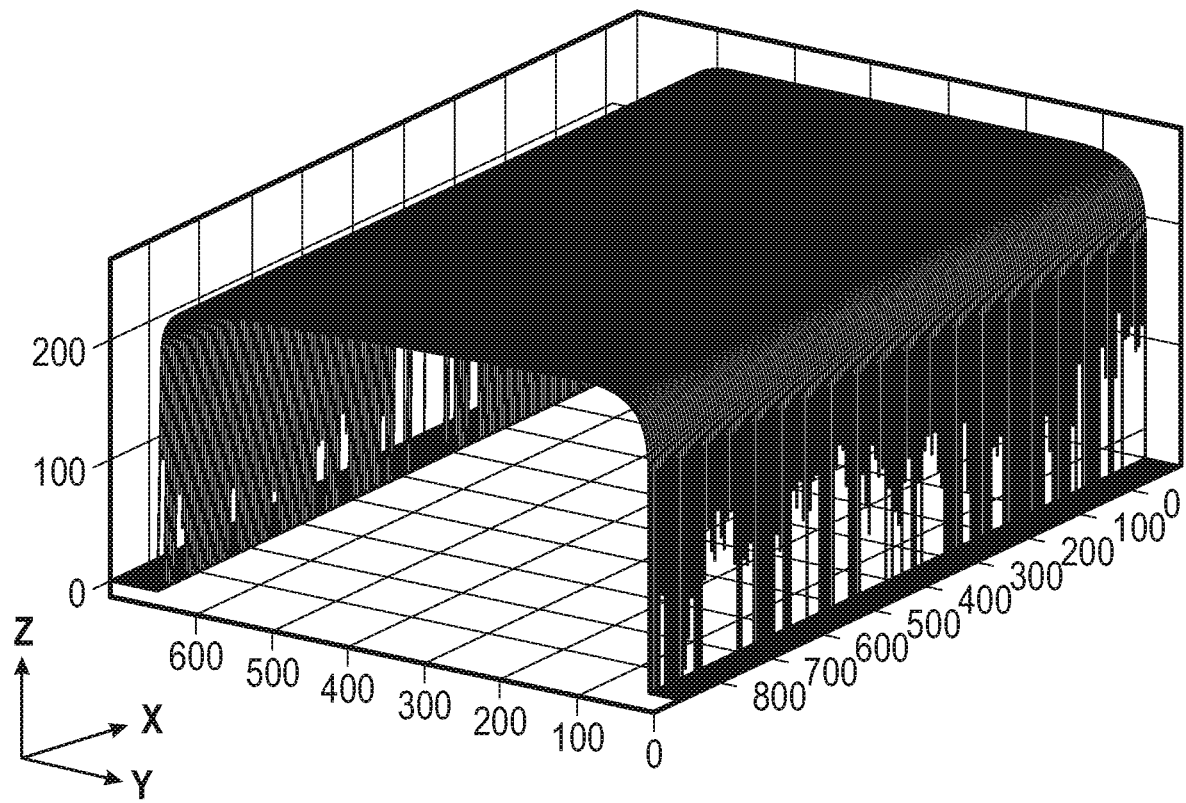
FIG. 7B is a three-dimensional graphical view of the disk edge of FIG. 7A.

FIGS. 7A and 7B show a disk 700, which is a modified version of disk 100 as shown in FIGS. 1A and 1B, after a process of creating an annular groove 704 on the outer edge 702 of the disk 700 as described herein. This annular groove 702 extends fully around the outer edge 702 of the disk 700 at the outer diameter thereof.

Figure 8A:
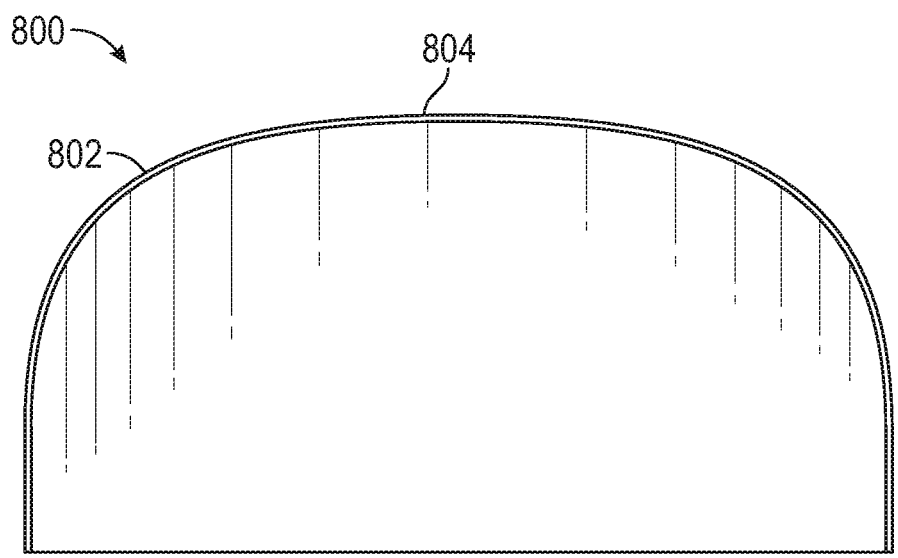
FIG. 8A is a side view of a disk edge of an annular grooved disk according to another embodiment of the present disclosure.
Figure 8B:
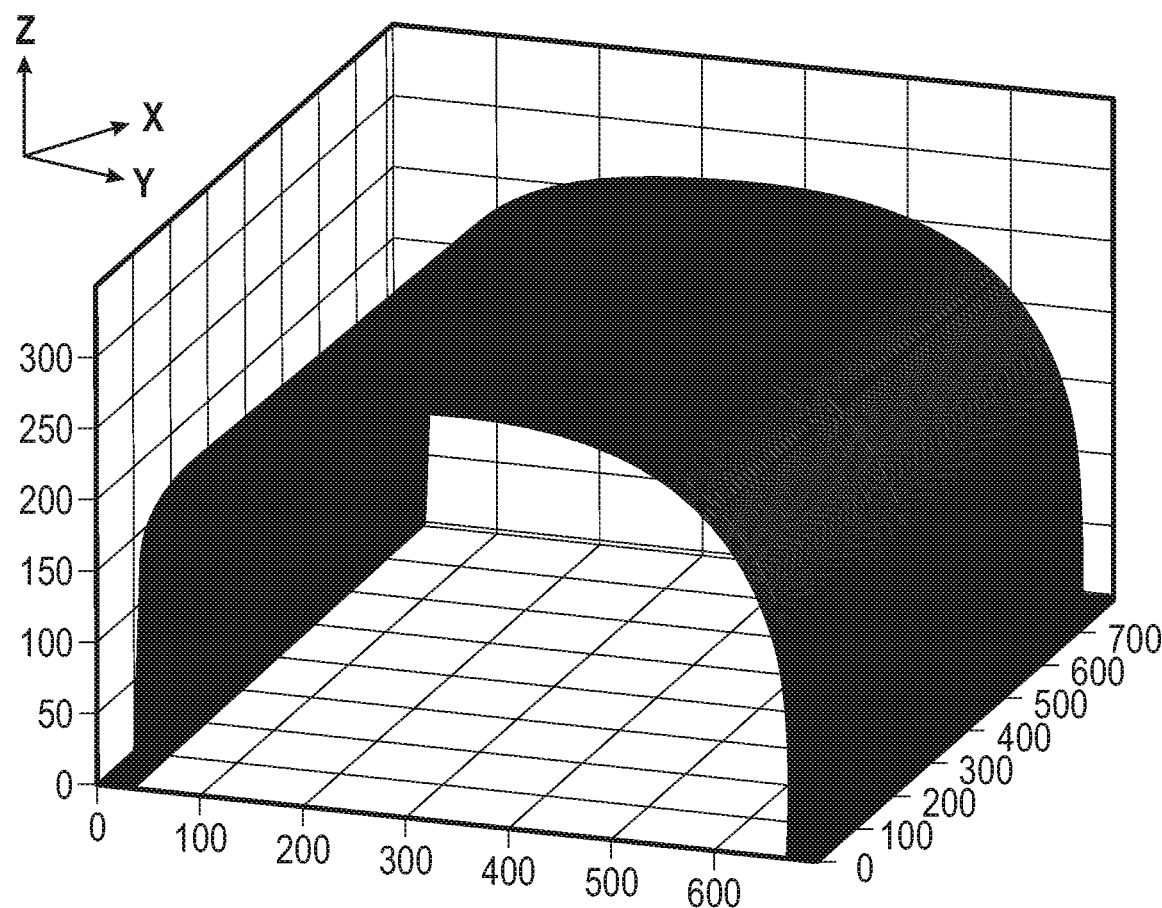
FIG. 8B is a three-dimensional graphical view of the disk edge of FIG. 8A.

FIGS. 8A and 8B show a disk 800, which is a modified version of disk 100 as shown in FIGS. 1A and 1B, after a process of creating an annular groove 804 on the outer edge 802 of the disk 800 as described herein. This annular groove 802 extends fully around the outer edge 802 of the disk 800 at the outer diameter thereof.

Figure 9:
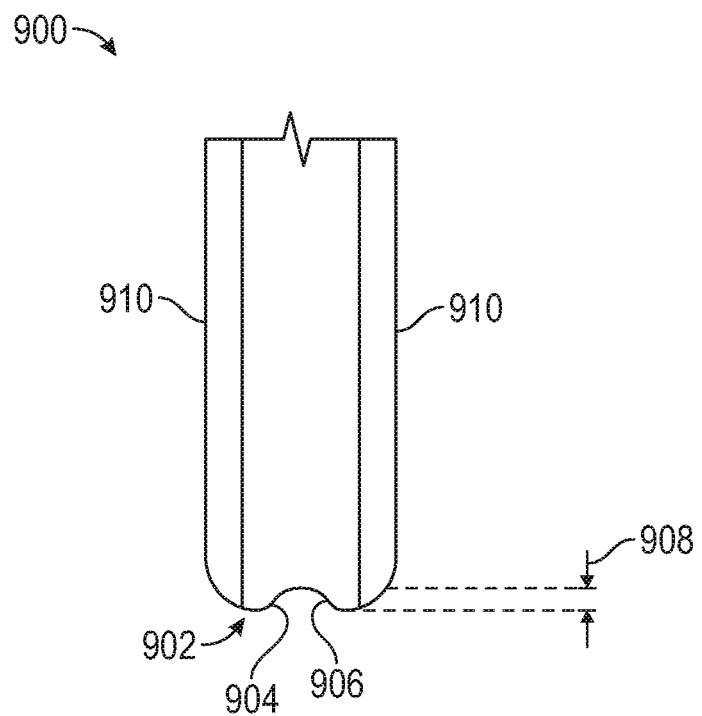
FIG. 9 is a side view of a grooved edge of a radiused disk according to another embodiment of the present disclosure.
Figure 9:
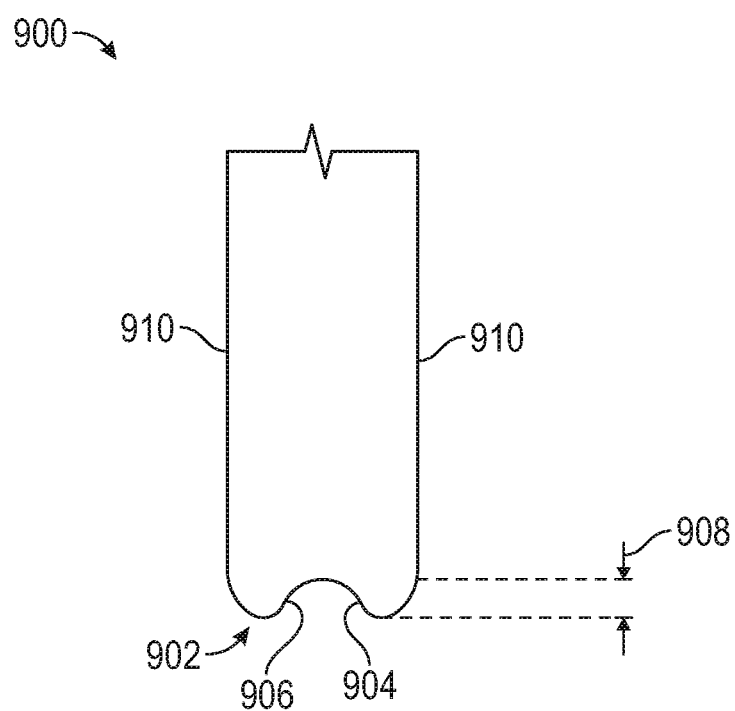

Further details of one embodiment of the annular grooves 704 and 804 is shown in FIG. 9. The details of an annular edge groove such as grooves 704 and 804 are shown in exaggerated detail in FIG. 9. In the embodiment shown in FIG. 9, an annular groove 904 is shown in a center 906 of a disk 900. Disk 900 has a thickness in one embodiment of about 20/1000 of an inch, and annular groove 904 is centered on that thickness, with a center of the annular groove approximately midway through the thickness of the disk 900. In one embodiment, the annular groove 904 has a depth of approximately 30% of the thickness of the disk (e.g., approximately 6/1000 of an inch). The edges of the disk outer diameter that transition the disk edge 902 to the disk flying surfaces 910 are in this embodiment fully radiused. However, the transitions could also be chamfered (as shown in FIGS. 2A and 2B) without departing from the scope of the disclosure.

With mechanical tooling on a 20/1000 thick disk, it is difficult to mechanically process an annular groove, due to the narrow width and fragile nature of the edges of the disk. However, with the use of laser edge treatment, the laser energy is used in one embodiment to heat up an area of the edge where an annular groove is to be positioned. The act of heating and cooling, along with rotation of the disk during edge treatment, changes the chemistry of the disk material enough so that it changes the edge shape without physically touching the disc. For example, in one embodiment, during laser chamfering or radiusing, the application of laser energy at a chosen wavelength, power, duration, pulse rate, and the like, or of different lasers, allows the disk material to reflow and to form the annular groove. As the glass substrate materials of different disks also differ, they respond differently to laser parameters (e.g. choice of laser type, absorption and heating characteristics). Therefore, for each different glass substrate material, a set of parameters is used to cause the desired annular grooving as discussed herein. The grooves that are formed in this process on the OD are sufficient in one embodiment to allow the discs to be centered on spaced apart center lines for later disk processing.

Figures 10, 11, 12:
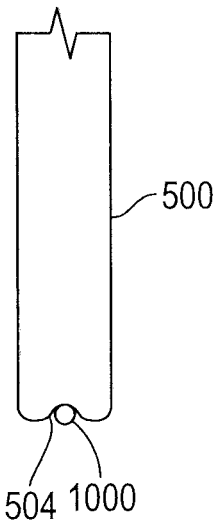
FIG. 10 is a side view of a portion of a disk registered on an annular grove according to an embodiment of the disclosure.
FIG. 11 is a flow chart of a method according to an embodiment of the present disclosure.
FIG. 12 is a flow chart of a method according to an embodiment of the present disclosure.

FIG. 10 illustrates a disk 500 (e.g., 500, 600, 700, 800, 900) being properly centered using its annular groove 504 on a wire 1000. While a wire 1000 is shown, a registration support such as a ridge, other support, or guide that allows registration of the annular groove 504 onto the ridge, other support, or guide is within the scope of the disclosure. Some disk treatment processes use tools that are more effective the closer they can be placed to the surface being treated. Some tools that are used in close proximity to surfaces being treated include heating and cooling elements whose positions are limited in how close they may be to the treatment surface because of registration issues with disks. Registration tolerances when clips are used means that cooling and heating elements are kept 1-2 mm farther away from the treatment surface than desired because of registration issues.

Embodiments of the present disclosure, with the annular outer diameter grooves on disks, allow for more reliable and consistent placement of tooling relative to disks being treated. Once a disk 500, 600, 700, 800, 900 is registered on the wire 1000, it is processed on the wire 1000. This allows for positioning of tooling for processing disks to be more precise, since the planar position of the disks 800 is more closely controlled using the annular groove 504 and support such as wire 1000.

Still further, the annular grooves 504, 604, 704, 804, 904 provide edge retention capabilities for disks on areas that are not typically used. Therefore, the amount of shadowing and damage that could occur from deposition is reduced.

A method 1100 of registering a non-metallic media substrate for processing is shown in flow chart form in FIG. 11. Method 1100 comprises providing the non-metallic media substrate with an annular groove along its outer diameter in block 1102, and aligning the annular groove with a registration support for processing in block 1104.

In one embodiment, the annular groove is provided by laser forming, as described herein. Choice of laser type, wavelength, power, duration, pulse rate, and the like is used to provide proper edge flowing to create the annular groove on the outer diameter of the disk. Laser forming in one embodiment comprises edge flowing with laser energy along the outer diameter of the non-metallic media substrate. Aligning the annular groove in one embodiment comprises positioning the annular groove on the registration support, with the registration support sized to position the non-metallic media substrate relative to a center of the annular groove. The registration support in one embodiment is a wire (e.g., wire 1000).

A method 1200 of manufacturing a hard disc drive substrate is shown in flow chart form in FIG. 12. Method 1200 comprises laser cutting the substrate from a sheet of substrate material, the substrate having an inner circular opening with an inner diameter, and an outer diameter in block 1102, and forming an annular groove in a thickness of a surface at the outer diameter in block 1104.

In one embodiment, the annular groove is formed positioned in a center of the thickness of the substrate at the outer diameter. The annular groove may be formed to extend fully around the outer diameter. The outer diameter of the substrate is edge treated in one embodiment. Edge treating the substrate at the outer diameter comprises in one embodiment forming a radius between the outer diameter and each media storage surface. Edge treating the substrate at the outer diameter comprises in one embodiment forming a chamfer between the outer diameter and each media storage surface. Forming the annular groove comprises in one embodiment laser treating the outer diameter with laser energy of a predetermined wavelength and power while rotating the substrate about an axis perpendicular to data storage surfaces of the substrate. Forming may further comprise rotating the substrate on a spindle through the inner diameter.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-metallic media substrate, comprising:
   at least one media storage surface on a face thereof;
   an inner diameter surface at a center opening;
   an outer diameter surface comprising chamfered edges;
   a thickness; and
   an annular groove positioned between the chamfered edges, the annular groove centered on the thickness of the substrate body, and the annular groove comprising an internal concavity extending from the outer diameter surface toward the inner diameter surface, the annular groove configured to align with a registration support for processing.

2. The non-metallic media substrate of claim 1, wherein the annular groove extends fully around the outer diameter surface.

3. The non-metallic media substrate of claim 1, wherein the annular groove has a depth of approximately 30 percent of the thickness of the substrate body.

4. An apparatus, comprising:

a disc shaped substrate having:

an inner circular opening with an inner diameter surface;

at least one face having a media storage surface; and an annular groove disposed on an outer diameter surface, the annular groove centered on a thickness of the disc shaped substrate, and the annular groove configured to align with a registration support for processing.

5. The apparatus of claim 4, wherein the disc shaped substrate further comprises chamfered edges on the outer diameter surface.

6. The apparatus of claim 4, wherein the annular groove is provided by laser forming.

7. The apparatus of claim 4, wherein the annular groove extends fully around the outer diameter surface.

8. The apparatus of claim 4, wherein the at least one face comprises two opposed faces of the disc shaped substrate, and wherein the outer diameter surface has a radius at each of the two opposed faces.

9. The apparatus of claim 4, wherein the annular groove comprises an internal concavity.

10. The apparatus of claim 4, wherein the annular groove has a depth of approximately 30 percent of the thickness of the disc shaped substrate.

* * * * *